United States Patent
Van Dijk et al.

(10) Patent No.: US 11,310,882 B2
(45) Date of Patent: Apr. 19, 2022

(54) CIRCUIT FOR GENERATING A DC VOLTAGE SUPPLY AND A DRIVER CIRCUIT USING THE DC VOLTAGE SUPPLY CIRCUIT

(71) Applicant: SIGNIFY HOLDING B.V., Eindhoven (NL)

(72) Inventors: Bernhard Christiaan Van Dijk, Geldrop (NL); Paul Robert Veldman, Oss (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/415,466

(22) PCT Filed: Dec. 12, 2019

(86) PCT No.: PCT/EP2019/084800
§ 371 (c)(1),
(2) Date: Jun. 17, 2021

(87) PCT Pub. No.: WO2020/126785
PCT Pub. Date: Jun. 25, 2020

(65) Prior Publication Data
US 2022/0070984 A1    Mar. 3, 2022

(30) Foreign Application Priority Data
Dec. 20, 2018    (EP) .................................... 18214334

(51) Int. Cl.
H05B 45/3725    (2020.01)
H05B 45/30      (2020.01)
H05B 45/37      (2020.01)

(52) U.S. Cl.
CPC ......... *H05B 45/3725* (2020.01); *H05B 45/30* (2020.01); *H05B 45/37* (2020.01)

(58) Field of Classification Search
CPC .... H05B 45/37; H05B 45/30; H05B 45/3725; H02M 7/06; H02M 3/07
See application file for complete search history.

(56) References Cited

U.S. PATENT DOCUMENTS

| | | | |
|---|---|---|---|
| 10,991,297 B2 * | 4/2021 | Lee | ......................... H02M 1/32 |
| 2011/0013426 A1 | 1/2011 | Keller | |
| 2011/0019451 A1 | 1/2011 | Ko | |

FOREIGN PATENT DOCUMENTS

| | | |
|---|---|---|
| EP | 2480049 A2 | 7/2012 |
| EP | 3076765 A1 | 10/2016 |

(Continued)

*Primary Examiner* — Abdullah A Riyami
*Assistant Examiner* — Syed M Kaiser

(57) ABSTRACT

A circuit is for generating a DC voltage supply from a higher voltage AC signal. A first capacitor (C1) is in series between an input (12) and a first node (N1), a first diode (D1) is in forward direction between the first node and a DC voltage supply node (Nout), a second capacitor (C2) is between the DC voltage supply node and a reference terminal, and a second diode (D2) is in forward direction between the reference terminal and the first node. This defines a general charge pump architecture. A third capacitor (C3) is then provided between the first node and a second node (N2) and a controllable voltage supply (60) defines the voltage at the second node (N2). This adjustable node voltage improves the efficiency of the circuit, in that excess current can be dissipated efficiently, and it can be implemented with a simple circuit.

7 Claims, 6 Drawing Sheets

(56) References Cited

FOREIGN PATENT DOCUMENTS

| GB | 2520963 A | * | 6/2015 | .......... H02M 3/1563 |
|----|-----------|---|--------|------------------------|
| GB | 2520963 A |   | 6/2015 |                        |
| WO | WO-2016110429 A1 | * | 7/2016 | ............. H05B 45/38 |
| WO | 2017178477 A1 |   | 10/2017 |                      |

* cited by examiner

CIRCUIT FOR GENERATING A DC VOLTAGE SUPPLY AND A DRIVER CIRCUIT USING THE DC VOLTAGE SUPPLY CIRCUIT

CROSS-REFERENCE TO PRIOR APPLICATIONS

This application is the U.S. National Phase application under 35 U.S.C. § 371 of International Application No. PCT/EP2019/084800, filed on Dec. 12, 2019, which claims the benefit of European Patent Application No. 18214334.7, filed on Dec. 20, 2018. These applications are hereby incorporated by reference herein.

FIELD OF THE INVENTION

This invention relates to the generation of a DC voltage supply, in particular from a high voltage AC signal. For example it relates to resonant power converters, for example used to provide AC/DC conversion, or to provide DC/DC conversion, or for the generation of a DC supply voltage or current from the power converter.

BACKGROUND OF THE INVENTION

Converters which are in the form of so-called resonant converters have a resonant circuit, which can be a series or parallel resonant circuit. Resonant converters which comprise an LLC resonant circuit having two inductances and one capacitance, or having an LCC resonant circuit having two capacitances and one inductance, are well-known for use within LED drivers.

The converters can be configured or operated as a constant current source or a constant voltage source. A constant current source can be used to drive an LED arrangement directly, thus enabling a single stage driver. Constant voltage sources can be used, for example, for LED modules which have further driver electronics in order to ensure a corresponding power supply to the LEDs. A predetermined current is then drawn from the output voltage provided by the constant voltage source.

Resonant power convertors often use a low voltage supply which has been derived from a high voltage AC, e.g. semi-square-wave, node present in the converter via a charge pump. This low voltage supply is essentially a current source with a current output which is proportional to the converter frequency and close to proportional to the bus voltage. The low voltage supply, for example 13V, is for supplying the control or driver integrated circuit and/or other circuitry. Most commonly, a so-called dV/dt supply is used in LCC type resonant convertors, which are used in the output stages of driver circuits for fluorescent lamps and LEDs.

The low voltage supply current not consumed by the load needs to be dissipated to limit or control the low voltage. This dissipation reduces driver efficacy and may also pose thermal challenges.

It is known to provide a dissipation path for excess current so that it does not pass to the load. However, implementing this dissipation path is difficult in practice, because the amount of current that needs to be dissipated varies over time.

SUMMARY OF THE INVENTION

The invention is defined by the claims.

According to examples in accordance with an aspect of the invention, there is provided a circuit for generating a DC voltage supply from a higher voltage AC signal, comprising:
an input for receiving the higher voltage AC signal;
a first capacitor in series between the input and a first node;
a first diode in forward direction between the first node and a DC voltage supply node;
a second capacitor between the DC voltage supply node and a reference terminal;
a third capacitor between the first node and a second node;
a second diode in forward direction between the reference terminal and the first node;
a controllable voltage supply; and
a diode arrangement comprising third and fourth diodes in series across the controllable voltage supply, with the junction between the third and fourth diodes defining the second node.

This circuit connects a capacitor in a charge pump type circuit to a controllable voltage supply. This provides a way to control when that capacitor provides a discharge path. In this way, the discharge path is controlled in dependence on the charge that needs to be diverted in order to generate a stable low voltage DC supply from a high voltage AC input with varying amplitude. By setting the voltage at the second node, the division of charge between the first diode (which flows to the load) and the third capacitor (which flows away from the load) is controlled.

The higher voltage AC signal is for example a rectified and chopped mains signal. Thus, it has a frequency which depends on the chopping rate, and an amplitude which varies at the slower mains rate.

The circuit may further comprise a voltage clamping device between one terminal of the first diode and the reference terminal, wherein the voltage clamping device for example is a Zener diode.

The magnitude of the voltage provided by the controllable voltage supply for example sets a voltage level for the input, which functions as a threshold which determines when charge will flow through the first diode. Thus, it controls, during each pulse of the AC input, whether charge is routed to the output via the first diode or is sunk into the controllable voltage supply.

When the magnitude of the voltage provided by the controllable voltage supply reaches an implementation limited minimum level (which may approximate zero), this corresponds to a minimum charge being delivered to the output node and a maximum charge being diverted into the controllable voltage supply.

This may be considered to be a saturation condition, in the sense that no more charge (per pulse of the AC signal) can be extracted/diverted from the first node. If the first capacitor (which functions as a charge pump) delivers even more charge into the first node, this excess charge will then still flow via the first diode into the DC voltage supply node.

A maximum magnitude of the voltage provided by the controllable voltage supply is smaller than the DC voltage supply voltage to enable the diversion of charge from the first node.

The magnitude of the voltage provided by the controllable voltage supply is for example smaller when more of a current received from the input needs to be diverted into the controllable voltage supply.

In one example, the magnitude of the voltage provided by the controllable voltage supply is controlled based on a current sensor which senses a current flowing to the DC output. This provides a current feedback mechanism for regulating the output current.

In another example, the magnitude of the voltage provided by the controllable voltage supply is controlled based on a voltage sensor which senses a DC output voltage. This provides a voltage feedback mechanism for regulating the output voltage.

The controllable voltage supply may comprise a transistor circuit having a control input at a voltage which depends on a current sensor output.

The controllable voltage supply for example comprises a bipolar transistor and a resistor connected in series, for example in parallel with the third and fourth diodes, and wherein the current sensor comprises a current sense resistor in series with the DC output, wherein a base voltage of the bipolar transistor depends on the current flowing through the current sense resistor.

The reference terminal may be ground.

The controllable voltage supply may have a terminal connected to a DC node or a low frequency AC node, directly or via a capacitor. This connection may for example be to ground, or to ground through a series capacitor or to the DC voltage supply node.

The invention also provides a driver circuit comprising:
a resonant switch mode power converter providing a first output for driving a load; and
a DC voltage supply circuit as defined above, wherein the high voltage AC signal is a second output from the resonant switch mode power converter.

The resonant switch mode power converter for example comprises an LCC converter.

The invention also provides a lighting circuit comprising:
a driver circuit as defined above;
a lighting load driven by the first output; and
auxiliary circuitry driven by the second output.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
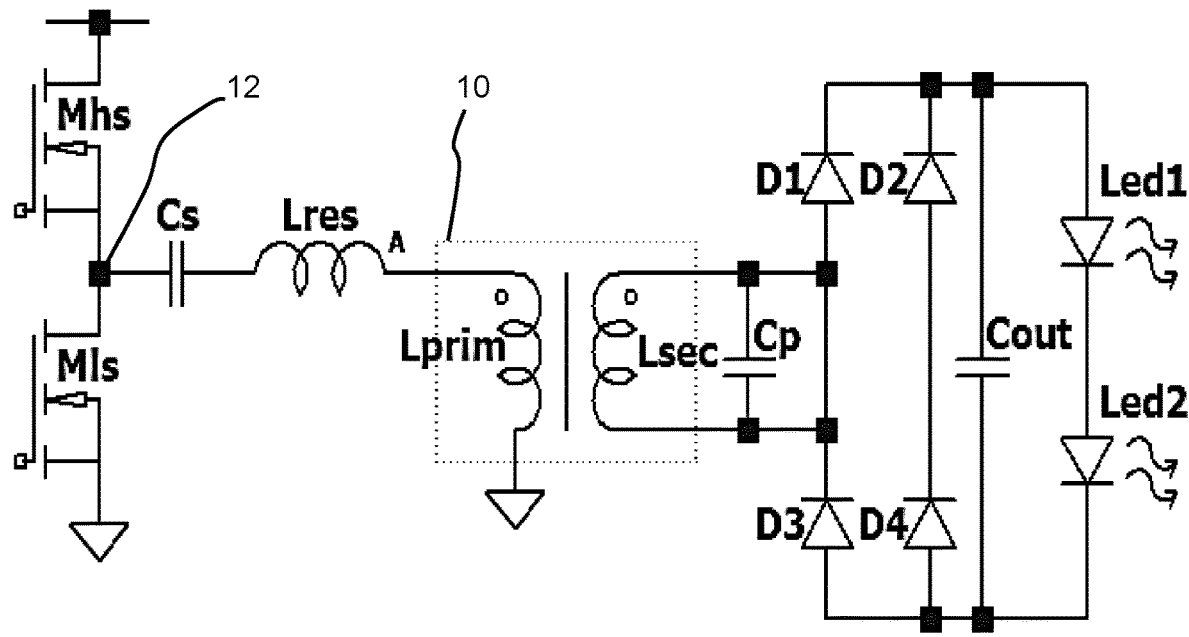
FIG. 1 shows an example of an LCC resonant switch mode power supply within an LED driver.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts or nodes.

The invention provides a circuit for generating a DC voltage supply from a higher voltage AC signal. A first capacitor is in series between an input and a first node, a first diode is in forward direction between the first node and a DC voltage supply node, a second capacitor is between the DC voltage supply node and a reference terminal, and a second diode is in forward direction between the reference terminal and the first node. This defines a general charge pump architecture. A third capacitor is then provided between the first node and a second node and a controllable voltage supply defines the voltage at the second node. This adjustable node voltage improves the efficiency of the circuit, in that excess charge per pulse of the AC input can be diverted into a lower voltage than the DC voltage supply voltage, thereby reducing dissipation and increasing efficiency, and it can be implemented with a simple circuit. In particular, an amount of excess charge is diverted which matches the charge not needed by the load.

FIG. 1 shows an example of an LCC resonant switch mode power supply within an LED driver, and with an isolated output.

A rectified mains input (or DC input for a DC/DC power converter) is provided to a half bridge inverter formed of a high side MOSFET Mhs and a low side MOSFET Mls. This inverter controls the power conversion operation, and the switching is controlled using feedback or feedforward control, in order to generate the required output. Each switch of the inverter has its timing of operation controlled by its gate voltage.

A resonant tank is formed by a series capacitor Cs and a series inductor Lres at the input side of the output transformer 10 (comprising a primary side inductor Lprim and a secondary side inductor Lsec), and a parallel capacitor Cp at the output side of the output transformer 10.

By placing the parallel capacitor Cp at the output side, the system still behaves as a 3rd order system (with the inductor of the LCC tank being the sum of Lres and leakage inductances).

The output is provided to the LED load Led1, Led2 through a diode bridge rectifier D1 to D4 and a smoothing output capacitor Cout.

During operation of the converter, a controller controls the switches of the inverter, at a particular frequency and in essentially complementary manner ("essentially" complimentary, in that there may be a non-overlap time period). A high gate drive signal turns on one switch no earlier than the other switch is turned off and a low gate drive signal turns off the one switch no later than the other switch is turned on.

In one known approach, the primary side circuit detects a variable which indicates an average value over time of a current flowing in the circuit, for example through the first or second switch. Information about the load may be derived on the basis of the measured current in the primary side circuit. The load current of the power converter may have a direct relationship with the LED load.

FIG. 1 shows a full-bridge rectifier at the secondary side and a single secondary coil which couples at its ends to the rectifier circuit. Instead, a center of the secondary coil Lsec may be coupled to an output of the secondary side circuit. The ends of the secondary coil may then be coupled to the output via a half bridge rectifier with only two diodes.

This is an example of an LCC circuit, but LLC circuits and other resonant circuits are also possible.

The general operation of resonant switch mode power converters will be well known to those skilled in the art.

The input to the resonant tank is a node 12 at which an essentially square wave high voltage AC signal is present. The frequency of this AC signal matches the switching frequency of the transistors Mhs and Mls, and is typically in the kHz range.

There may additionally be a power-factor correction stage between the output stage (the LCC circuit in this example) and the AC mains. Consequently, the input voltage will normally not show very substantial (double) mains frequency ripple. Conversely, the frequency of the node 12 voltage can vary substantially over the combination of possible LED string voltages, which depend on the LEDs being connected to the LED driver, on temperature (there is a slight variation of the LED string voltage with temperature), and on a commanded dim-level.

There is therefore a variation in output current due to variation in frequency.

Figure 2:
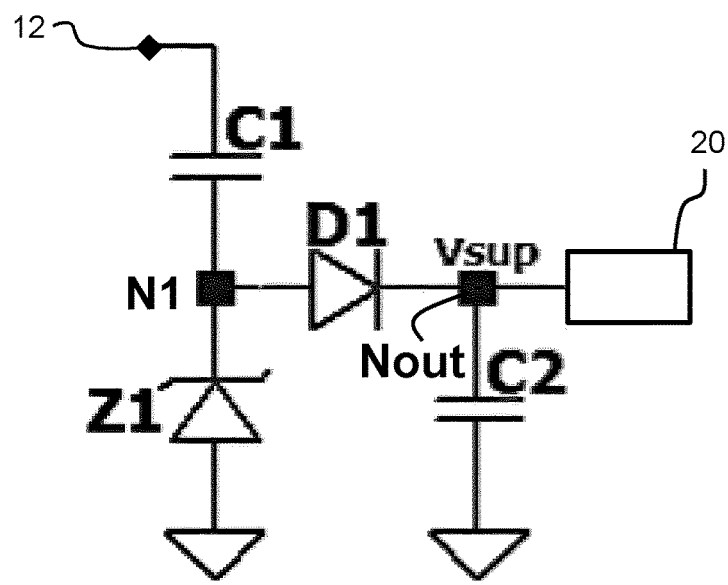
FIG. 2 shows an example of a known circuit for deriving a low voltage supply, in one of its simplest forms.

FIG. 2 shows an example of a known circuit for deriving a low voltage supply, in one of its simplest forms, from the signal at node 12.

Note that in FIG. 2 and other circuits, components and nodes are all denoted with regular text, whereas the corresponding values are denoted with subscripts. For example $C_3$ is the capacitance of capacitor C3.

The high voltage swing at the high voltage (HV) square wave node 12 charges a first capacitor C1 and a second capacitor C2 via a first diode D1 during rising voltage transitions of the voltage at the HV node 12. The circuit discharges the first capacitor C1 via a clamping device, which in this example is represented as a Zener diode Z1, during falling voltage transitions of the HV node voltage. This implements a charge pump operation.

When using Zener diode voltages greater than 6.2V, the clamping function is more accurately an avalanche effect rather than a Zener effect, causing the breakdown/breakover of the device. However, the term Zener diode is used generally below. However, depending on the selected voltage, an avalanche type diode may be assumed instead. Thus, the clamping device may be considered generally to comprise a reference diode, which may function as a Zener diode or an avalanche diode, depending on the voltage selected. The Zener diodes shown in the circuits are thus simply presented as an example for ease of explanation.

The output is a DC voltage supply node Nout which connects to low voltage circuitry 20 and delivers a DC voltage Vsup. The low voltage circuitry for example oper-
ates between 5V and 20V, and may comprise control circuits, sensors, signal processors etc.

The maximum charge delivered by the capacitor C1 to the DC voltage supply node Nout for each high frequency (HF) pulse of the HV node voltage is:

$$Q1 = (V_{HV,pp} - Vsup - 2*V_{be}) * C_1.$$

$V_{HV,pp}$ is the peak to peak voltage of the high voltage supply at node 12.

$V_{be}$ refers to the forward voltage of the PN semiconductor junction of the first diode D1 and the Zener diode Z1 (in the forward direction).

For charge to flow for charging the first capacitor C1 (and the second capacitor C2), the voltage at the first node N1 must be at $Vsup + V_{be}(D1)$; for charge to flow for discharging the first capacitor C1, the voltage at the first node N1 must be $Gnd - V_{be}(Z1)$, wherein the voltage Gnd is zero.

Thus, no charge will flow to C1 when the voltage at the first node N1 is between $Vsup + V_{be}(D1)$ and $-V_{be}(Z1)$.

Thus, the total voltage swing at the first node N1 when no charge can flow to the first capacitor C1 is $Vsup + V_{be}(D1) + V_{be}(Z1) = Vsup + 2*V_{be}$. The voltage change across the first capacitor C1 is then equal to the voltage swing ($V_{HV,pp}$) at the high voltage square wave node 12, minus this voltage swing at node N1 for which no charge flows to capacitor C1.

The charge displaced via the first capacitor C1 is then its voltage swing ($V_{HV,pp} - \{Vsup + 2*V_{be}\}$) times the C1 capacitance, giving the relationship above.

Thus, the maximum output current equals this charge multiplied by the HV node frequency. Any charge not consumed by the load supplied by the output node Nout will be dissipated in the Zener diode Z1, limiting the voltage Vsup to $V_{Z1} - V_{be}$, where $V_{Z1}$ is the Zener diode threshold voltage.

Figure 3:
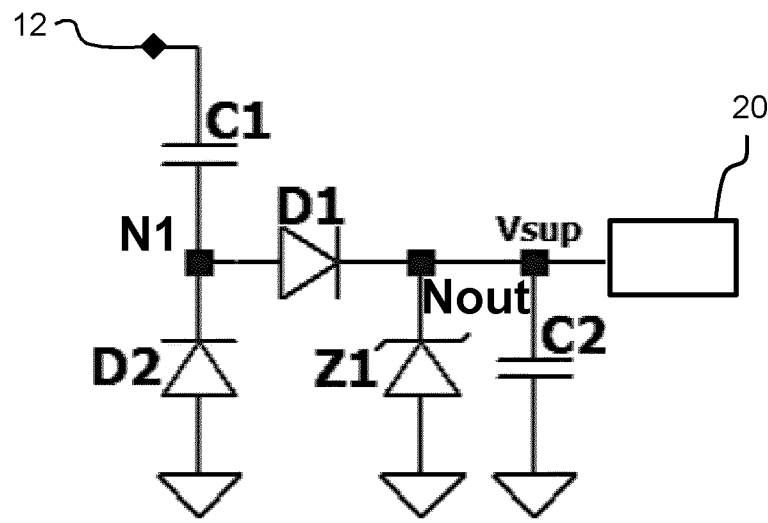
FIG. 3 shows a modification to the circuit of FIG. 2.

FIG. 3 shows a modification to the circuit of FIG. 2, in which the Zener diode Z1 is moved to the output side and the diode forward function of the Zener diode Z1 in FIG. 2 is replaced by a second diode D2.

The charge flow through the first capacitor C1 generally consists of narrow pulses of high current, which occur during the sloped portions of the HV (near square wave) waveform. In its FIG. 2 position, the Zener diode Z1 needs to have a very low dynamic resistance, making it difficult to use a small-signal Zener diode.

In its FIG. 3 position, the Zener diode Z1 can, if necessary, use almost the full HF cycle to clamp and thereby limit the low supply voltage at the DC voltage supply node Nout.

The voltage clamping function of the Zener diode Z1 might also be performed by the low voltage load, for example by a control circuit. This might have the advantage that the voltage clamping level Vsup can track other reference voltages inside that control circuit.

The benefit of the above circuits is that the presence of the HV capacitor C1 is already desirable in the application, as its presence will limit the value of dV/dt, namely the slopes of the HV square wave, reducing EMI and reducing switching losses. Indeed, there may be additional capacitors connected between node 12 and Gnd and/or the node above the upper transistor Mhs of the inverter to help limit the slopes and reduce EMI.

Thus, the HV square wave in fact has slopes of limited steepness so is not a perfect square wave signal.

However, in these circuits, the charge per pulse varies with the magnitude of the HV voltage, and thus the resulting output current varies with the HV voltage and the frequency of the signal at the HV node 12. The capacitance of the first capacitor C1 must be selected such that at minimum magnitude and frequency of the HV voltage, the minimum required current can be delivered to the low voltage load, and hence at a higher magnitude and/or frequency of the HV voltage, more current tends to be delivered than is required. That excess current will now be clamped by the function of Zener diode Z1 and result in an (extra) dissipation equal to that excess current times Vsup+$V_{be}$. From an efficiency point of view, this dissipation is obviously undesirable, and for higher power drivers (where the minimum required low voltage supply current is generally higher due to driving bigger MOSFETs) this might also pose extra thermal challenges.

It is therefore desirable to have a method for reducing the power losses associated with the clamping of the excess supply current being delivered in these general types of charge pump circuit.

One such method could involve reducing the capacitance of the first capacitor C1 with increasing magnitude of the HV voltage, which would potentially be possible by implementing the first capacitor C1 with a voltage-dependent dielectric material. However, this is impractical for several reasons and it would also not address the frequency dependency of the excess supply current. Switching the capacitance of the first capacitor C1 using a switched capacitor circuit is also impractical because the capacitor C1 is a high voltage capacitor.

Figure 4:
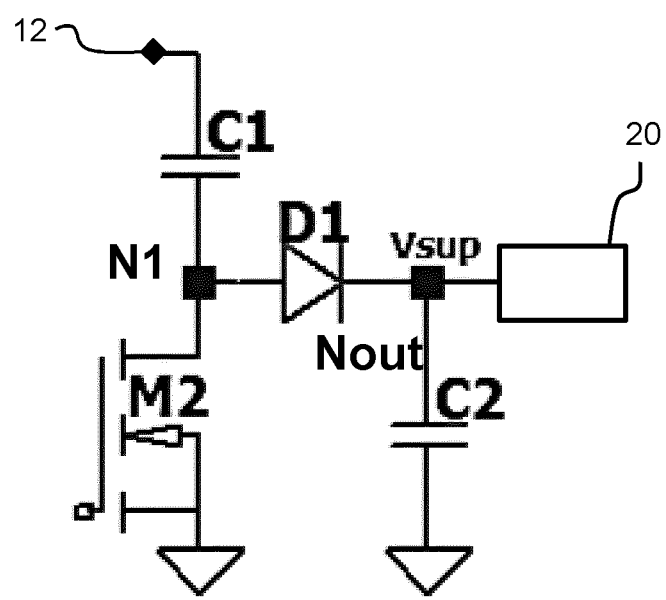
FIG. 4 shows an alternative approach for generating a low voltage supply that has been proposed.

FIG. 4 shows an approach that has been proposed. The Zener diode of FIG. 2 is replaced by a MOSFET M2. The body-diode of MOSFET M2 provides a current path for falling slopes of the HV voltage.

At times when the voltage Vsup is too low, the MOSFET M2 is off and pulses of charge for charging the first capacitor C1 will flow via the first diode D1 into the node Nout. At times when the voltage at the node Nout is sufficiently high, the MOSFET M2 is driven to its on state and effectively shorts the first node N1 between the first capacitor C1 and the first diode D1 to ground, letting the pulses of charge for charging the capacitor C1 to flow to ground, incurring no losses.

Preferably, the MOSFET M2 switches in synchronism with the HV voltage switching instants. As mentioned above, the charge flow through the capacitor C1 normally consists of narrow pulses of relatively high current. The MOSFET M2 needs to handle those high forward and reverse currents, making the implementation of M2, particularly inside an IC, challenging. However, from a loss perspective this solution is ideal: all excess current/charge from the capacitor C1 flows directly into ground.

As the magnitude and the frequency (range) of the HV voltage cannot be changed, and it is desired for the capacitor C1 to have a fixed value, the invention instead provides a reduction in loss associated with the excess charge of the first capacitor C1 by clamping it to a lower voltage than the voltage Vsup at the DC voltage supply node Nout.

The invention makes use of the same basic charge pump structure, namely with a first capacitor C1, a first diode D1, a second capacitor C2 and optionally a voltage clamping device (e.g. Zener diode Z1) for example as in FIG. 3. However, there is an additional third capacitor and a controllable voltage supply associated with the third capacitor.

Figure 5:
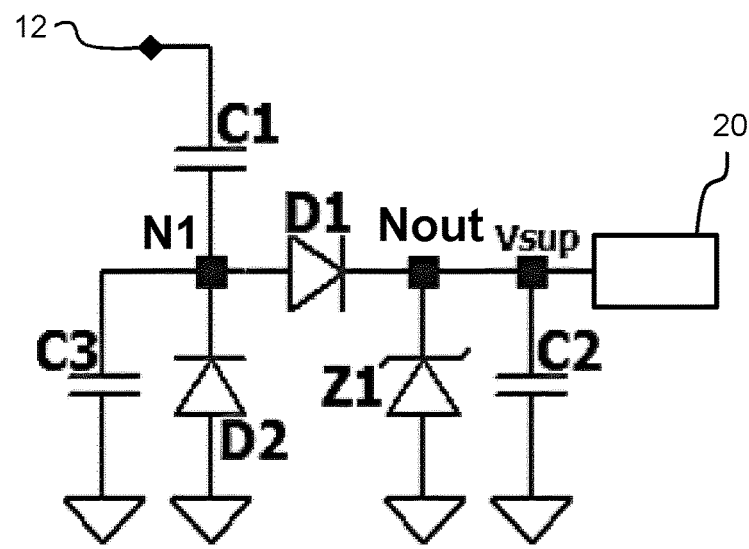
FIG. 5 shows a modification to the circuit of FIG. 4 with a third capacitor connected to ground.

It is known to provide a third capacitor, but which is instead connected to ground. FIG. 5 shows this configuration. The third capacitor C3 is connected between the first node N1 and ground.

The addition of the third capacitor C3 connected to ground has the following impact. If it is assumed that the HV node 12 is at ground and the node N1 between the first capacitor C1 and the first diode D1 is at $-V_{be}$, then when a rising slope occurs at the HV node 12, charge will only flow through the first diode D1 once the anode of D1 reaches a voltage of Vsup+$V_{be}$. This requires a voltage swing of Vsup+$2*V_{be}$ at the anode of the first diode D1. As C1 and C3 form a capacitive divider, the HV node must increase to: (Vsup+$2*V_{be}$)*(1+$C_3/C_1$) before current will flow through the first diode D1.

Only the remainder of the voltage swing at the HV node is now available for delivering charge to the output node Nout at the voltage Vsup. Therefore, the larger the capacitance of C3, the smaller the amount of charge available for charging the node Nout to the voltage Vsup.

In theory, having a third capacitor C3 with adjustable capacitance would allow to tune the charge available per pulse to the output to exactly the amount required. Although less impractical than tuning the high voltage capacitor C1, tuning the capacitance of the third capacitor C3 is still challenging to implement in e.g. a switched capacitor approach, and impractical to implement in a discrete circuit fashion.

Figure 6:
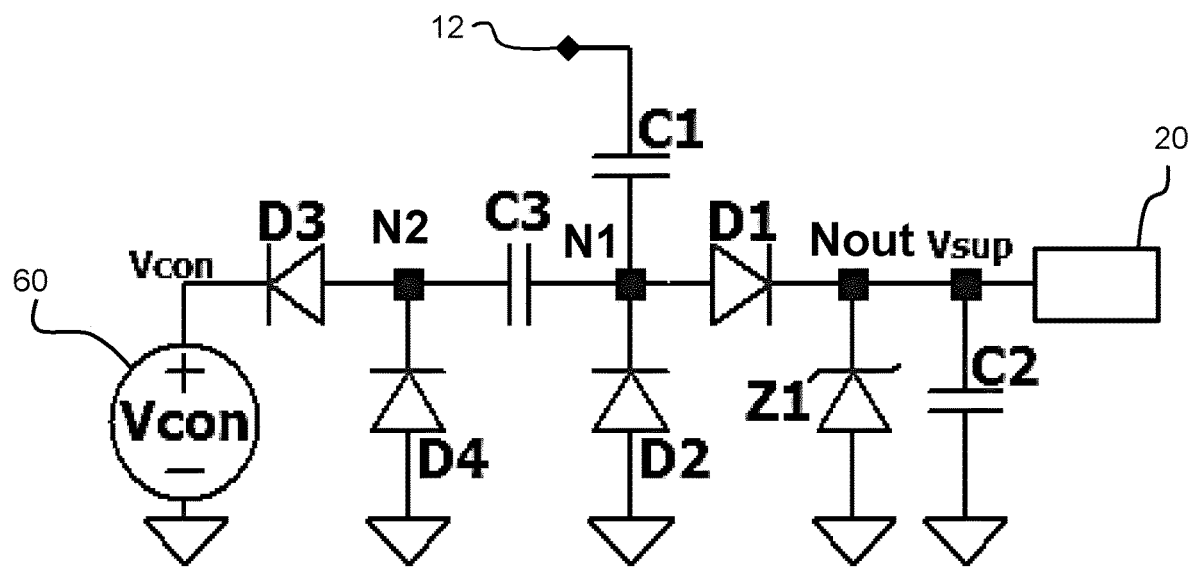
FIG. 6 shows a first example of a circuit in accordance with the invention.

FIG. 6 shows a first example of a circuit in accordance with the invention.

The third capacitor C3 is no longer connected directly to ground, but rather via a third diode D3 to a controllable voltage supply 60 which functions as a charge sink at a voltage Vcon. A fourth diode D4 provides a path for the charge pulses through the third capacitor C3 in the reverse direction. The third and fourth diodes D3, D4 are in series and function as a diode arrangement across the controllable voltage supply 60. The junction between the third and fourth diodes defines the second node N2.

Thus, the clamping in this circuit is achieved by adding a third capacitor C3 between the first node N1 connecting the first capacitor C1 and the first diode D1, and a second node N2 that is required to make a voltage swing of Vcon+$2*V_{be}$ before charge can be injected and extracted via the third capacitor C3. The magnitude of Vcon is smaller than the voltage Vsup and is controlled to approximate a desired value of the voltage Vsup and/or deliver only a desired amount of current to the low voltage load.

By introducing a swing in voltage between Vcon+$V_{be}$ and $-V_{be}$ at the node N2 between the third diode D3 and the fourth diode D4, the HV node must now increase to: Vsup+$2*V_{be}$+(Vsup-Vcon)*$C_3/C_1$ before charge will flow through the first diode D1.

As explained above, the charge flow through capacitors C1 and C3 is the in the form of high frequency pulses. It is the amount of charge per high frequency pulse that is relevant to the final current delivered to the load. This is the amount of charge displaced through C1 and C3 (respectively) during excursions in voltage of the high voltage AC input node 12 from its lowest to its highest voltage or vice versa during one HF cycle of that voltage.

The charge per pulse for capacitor C1 has been defined above as:

$$Q1 = (V_{HVpp} - Vsup - 2*V_{be}) * C_1$$

The charge per pulse for capacitor C3 may be defined as:

$$Q3 = (Vsup - Vcon) * C_3$$

It can be seen that the charge Q3 can be controlled by varying Vcon (the $V_{be}$ diode voltage drop of D1 and D2 cancels to the first order with the drop of D3 and D4).

As the capacitors C1 and C3 conduct the same instantaneous current as long as D1 or D2 do not (yet) conduct, the amount of charge displaced through C1 and C3 up to the point in time when D1 or D2 become conductive is the same, and equal to Q3.

Thus, the amount of charge per pulse through capacitor C1 available for delivery into the output node Nout via diode D1 equals Qout=Q1−Q3. This is the full amount of charge per pulse Q1, minus the amount of charge already displaced through C1 at the time D1 becomes conductive.

During a rising excursion (in this example) in voltage of the high voltage AC input node 12, the output charge flows via the first diode D1 into the output node Nout and is filtered by the second capacitor C2. The output charge per pulse is delivered once per high frequency cycle and constitutes an average current equal to the output charge per pulse Qout divided by the time period of the HF cycle (Thf):

$$I{out,avg}=Qout/Thf$$

$$=Qout*Fhf.$$

Fhf is the frequency of the signal at the HF node 12. The averaging is essentially performed via the second capacitor C2. For the low voltage DC supply it is ultimately the average value of the current delivered to and extracted from the output Nout that is relevant.

When referring below to the current into the output node Nout, this relates to the charge delivered into the output node Nout via the diode D1 per high frequency cycle, averaged over the HF cycle. Similarly, when referring to the (supply) current extracted from the output node Nout, this relates to the charge extracted from the output node Nout delivered to any load connected to the Nout node per high frequency cycle, averaged over the HF cycle. Note that in stable operation the average current of the capacitor C2 is zero.

The supplied charge Qsup may be considered to be the amount of charge extracted by the combined load connected to the output Nout node during an HF cycle of the high voltage AC node 12:

$$Qsup=Isup,avg*Thf=Isup,avg/Fhf.$$

For stable operation, Qout and Qsup are equal.

If Qout<Qsup, the supply voltage Vsup would decrease; conversely, for Qout>Qsup it would increase.

If Qout<Qsup, the level of Vcon is increased, such that the charge Q3 associated with the third capacitor C3 decreases and thus Qout increases to ultimately make Qout match Qsup.

Ideally, if Qout>Qsup, the level of Vcon is reduced, such that the charge Q3 increases and thus Qout decreases to ultimately make Qout match Qsup, Alternatively, if Qout>Qsup and Vcon cannot be, or is not, reduced any further (e.g. at "saturation" as explained above), the surplus charge Qout−Qsup needs to ultimately flow into the voltage clamping device (Z1) and be dissipated, yielding a Z1 average current of:

$$(Qout-Qsup)*Fhf=Iout,avg-Isup,avg$$

A loss energy per HF cycle in the voltage clamping device Z1 is:

$$(Qout-Qsup)*Vsup$$

A corresponding power loss associated with Z1 is:

$$(Iout,avg-Isup,avg)*Vsup=(Qout-Qsup)*Fhf*Vsup=$$
$$(Q1-Q3-Qsup)*Fhf*Vsup.$$

By adjusting Vcon such that Q1−Q3−Qsup=0, dissipation in Z1 can be prevented. In this way, the voltage clamping device Z1 is not needed. This is possible if the charge Q3 can be increased to prevent the need for power dissipation in the voltage clamping device Z1. Thus, the voltage clamping device is not essential to the invention.

The charge Q3 extracted from the node N1 flows into Vcon and thus yields a power dissipation of Q3*Fhf*Vcon.

As Q3=(Vsup−Vcon)*C3 the power dissipation in Vcon caused by the displacement of charge Q3 through capacitor C3 is:

$$Vcon*(Vsup-Vcon)*C_3*Fhf=Q3*(Vsup-Q3/C_3)*Fhf.$$

This gives the parabolic loss curves explained below with reference to FIGS. 7 and 8.

In this way, there is a reduced loss of Q3*Fhf*Vsup in the clamping device Z1 but there is an increased loss of Q3*Fhf*Vcon. Thus, there is a net reduction of Q3*FhP (Vsup−Vcon) in dissipation.

As Q3=(Vsup−Vcon)*$C_3$ the reduction in loss is (Vsup−Vcon)^2*$C_3$*Fhf

From this relation, it is clear that as Vcon becomes closer to zero, Q3 becomes bigger. When Vcon saturates at zero or somewhat above zero, Q3 is not able to increase any further and thus also Q3 "saturates" by which is meant that it is not possible to extract more charge via C3 from the node N1. If the resulting charge per pulse per HF cycle Qout=(Q1−Q3) is then still more than Qsup, the amount of charge per HF cycle that is extracted from the node Nout, that surplus charge needs to flow into the voltage clamping device (Z1) causing dissipation in that device.

For Vcon=0, the behavior is very close to that of FIG. 5. However, by adjusting the voltage Vcon between Vsup and 0 the voltage is controlled by which the HV node needs to increase before charge flows via D1 to the DC output node Nout.

The result is somewhat similar to creating an adjustable capacitance for the third capacitor C3 by varying the Vcon voltage.

By properly controlling the voltage Vcon, it can be arranged that no excess charge from the first capacitor C1 flows into the first diode D1, but rather flows via the third capacitor C3 and the third diode D3 into the controllable voltage source 60.

With regard to the speed of adjustment of Vcon, during each individual charge pulse, Vcon is constant. If there is a voltage clamping device in the system, a reduction of Vcon can be very slow, as the excess current will flow into the voltage clamping device Z1 during the time Vcon needs to be lowered.

The required speed at which Vcon needs (at least) to be increased is normally determined by the speed at which the supply current increases. The required speed depends on the drop in the voltage Vsup at which the circuitry connected to the output node Nout will still work correctly, and the capacitance of C2.

In general terms, the speed at which Vcon is adjusted is such that Vcon needs to be essentially constant during a high frequency cycle of node 12, but changes sufficiently fast to at least match the speed at which the Vsup voltage changes in response to (dynamic) changes in the supply current extracted by the output node Nout to the connected load circuitry.

In theory, a single Zener diode Z2 (in either direction) could replace the third and fourth diodes D3 and D4 and the controlled voltage source 60 (which functions as a sink dissipating power, rather than a source delivering power). However, the clamping voltage level would need to be adjustable, and the controllable voltage source of the invention, implementing a controllable sink, is more easily implemented.

As the voltage Vcon is lower than Vsup, the associated dissipation is accordingly lower.

When more excess charge needs to be extracted via C3, the voltage Vcon must be lower. This means that at high excess currents, the associated dissipation will be low rather than high.

As Vcon decreases almost linearly down from Vsup with increasing excess current to be sunk, the power loss as a function of excess current will have a parabolic shape which peaks at Vcon=Vsup/2 at half the maximum excess current that can be sunk at Vcon=0.

Figure 7:
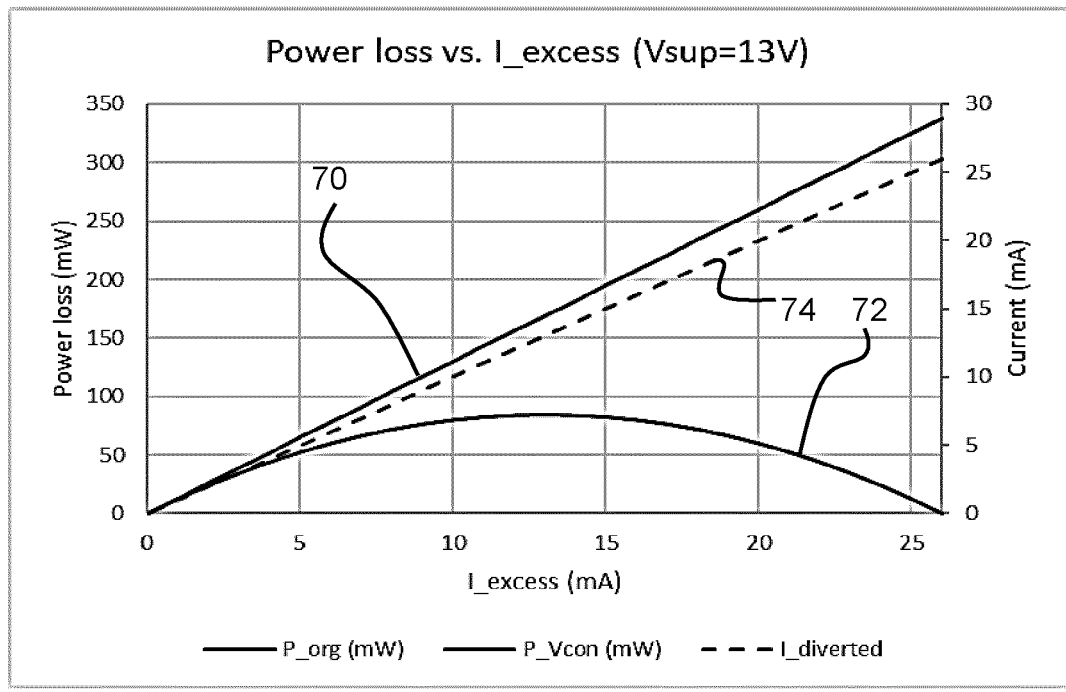
FIG. 7 shows the corresponding function of power loss (left y-axis, mW) versus excess current (x-axis, mA) for the solution of FIG. 5 and for the circuit of FIG. 6.

FIG. 7 shows the corresponding function of power loss (left y-axis, mW) versus excess current (x-axis, mA). Plot 70 shows the power loss for the solution of FIG. 5 in which all excess current is dissipated into the node Nout. Plot 72 shows the performance of the circuit of FIG. 6, assuming the capacitance of C3 is selected such that at Vcon=0 the full/maximum excess current is diverted towards the DC output node Nout. The example is for Vsup=13V and a maximum excess current of 26 mA. This means the circuit can be implemented without the voltage clamping device (assuming the excess current never exceeds 26 mA).

Plot 74 shows the diverted current, using the right y-axis, mA.

As can be seen, the maximum power loss in the circuit of FIG. 6 is only 25% of that in the original solution (in this example, 83 mW vs. 332 mW).

An even better result can be achieved by choosing the capacitance of C3 to be slightly smaller, such that at Vcon=0 not the full maximum excess current is diverted into the controllable voltage supply 60.

Figure 8:
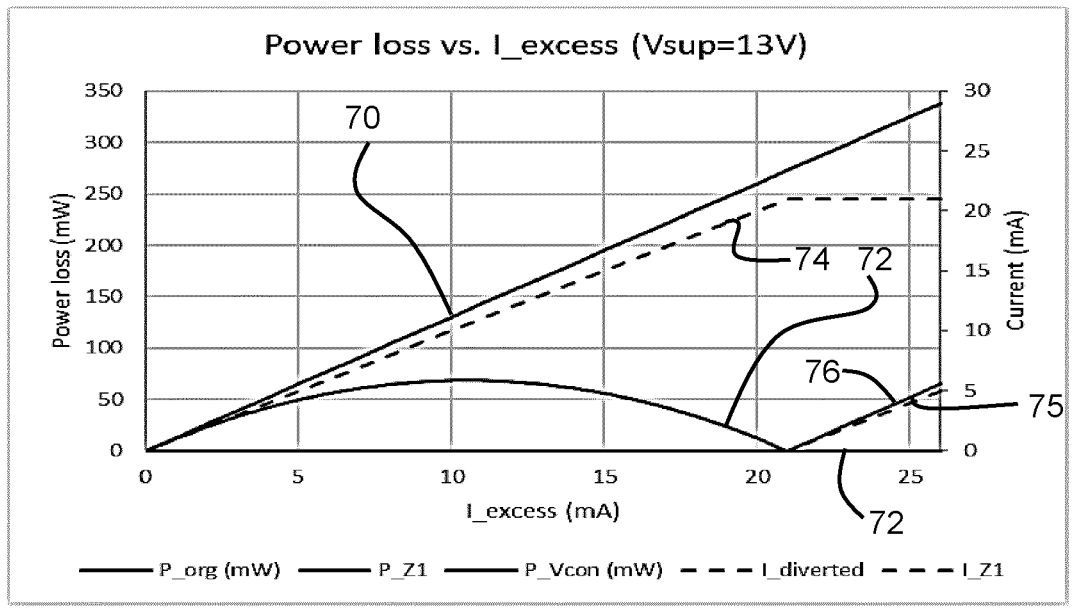
FIG. 8 shows the corresponding plots to those of FIG. 7 with a smaller capacitance of the third capacitor.

FIG. 8 shows the corresponding plots to those of FIG. 7 for this reduced capacitance.

By choosing the capacitance of C3 to be smaller than in FIG. 7, the current diverted into the controllable voltage supply 60 saturates when Vcon has reached a minimum (which approximates zero; plot 72 is zero above an excess current of 21 mA) and the surplus in excess current will now still be clamped by Z1 (or equivalent) at the voltage level Vsup of the node Nout. Plot 75 (dotted) shows the current through Z1 and plot 76 is the power dissipated by Z1. Plot 76 is zero until the excess current of 21 mA. This is the case once Vcon saturates as explained above.

By making the capacitance of C3 about 20% smaller than for FIG. 7, the maximum of the parabolic loss curve 72 and the loss through Z1 loss (plot 76) can be made about equal, and will be lower than the maximum in FIG. 7, giving in the best case only ~20% of the maximum loss in the original solution.

Note that it is ultimately the magnitude of the peak to peak voltage swing (Vpp) at the second node N2 of capacitor C3 rather than the absolute voltage level at that node (or indeed the absolute voltage Vcon) that determines how much charge is displaced through C3 before D1 becomes conductive.

Figure 9:
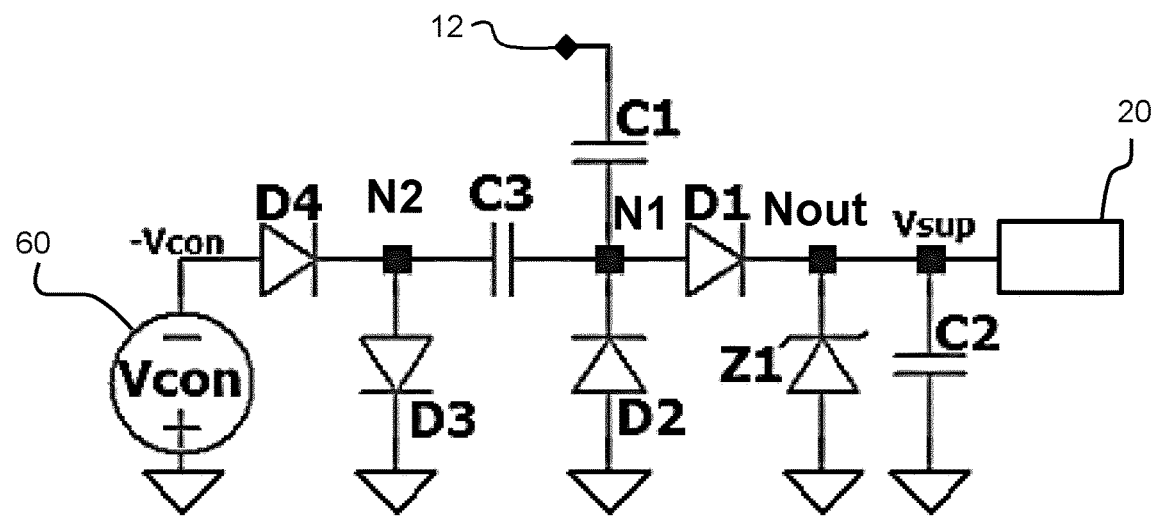
FIG. 9 shows a variation to FIG. 6 with a negative controllable voltage supply.

Vcon can therefore just as well be a negative voltage (with diodes D3 and D4 reversed) as shown in FIG. 9.

Figure 10:
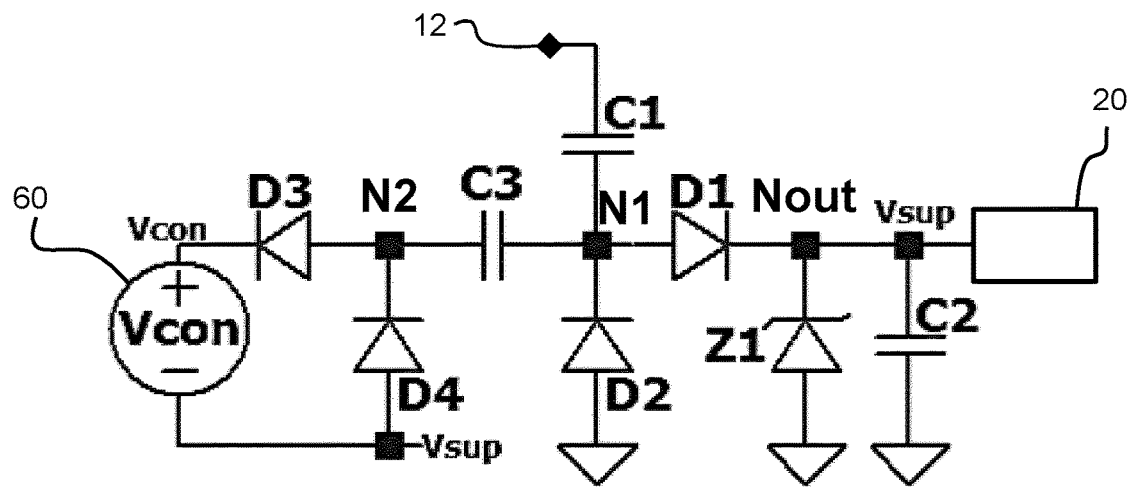
FIG. 10 shows a variation to FIG. 6 with a shifted controllable voltage supply.

The voltages at the controllable voltage supply 60 may instead be lifted or dropped in DC level, for example superposed on top of the voltage Vsup, as in FIG. 10. In both cases, this impacts the average (DC) level of the voltage at the second node N2, which shift in DC component is now absorbed across C3.

Although the example described above makes use of the voltage Vcon ranging from Vsup down to (or to a saturation point close to zero), the maximum voltage swing at the second node N2 may be less, e.g. based on how Vcon is implemented. A more limited dynamic range in Vcon can easily be compensated by using a larger C3 capacitance. The dynamic range in Vcon should however not be chosen substantially smaller than Vsup, as that would adversely affect the target of lowering dissipation while diverting excess current.

In all examples above, an increasing magnitude of Vcon (from 0 to Vsup) will result in a reduction in charge per pulse being extracted via C3, and thus increase the (average) current delivered to the node Nout.

The error signal between the actual voltage Vsup at the DC voltage supply node Nout and a desired value can be used to adjust the voltage Vcon, and consequently change the average current diverted from the node Nout, such that the difference between the actual and desired value of the voltage Vsup is reduced. Thus, feedback control may be used to adapt the voltage Vcon.

Alternatively, an error signal between the actual current delivered to the load at the DC voltage supply node Nout and a desired value of this current can be used to adjust the voltage Vcon, and consequently change the average current diverted from the node Nout, such that the difference between the actual and desired value of the load current is reduced. Note that this load might include the Z1 clamp function.

Any such control systems might additionally exhibit some form of dynamic behavior.

Figure 11:
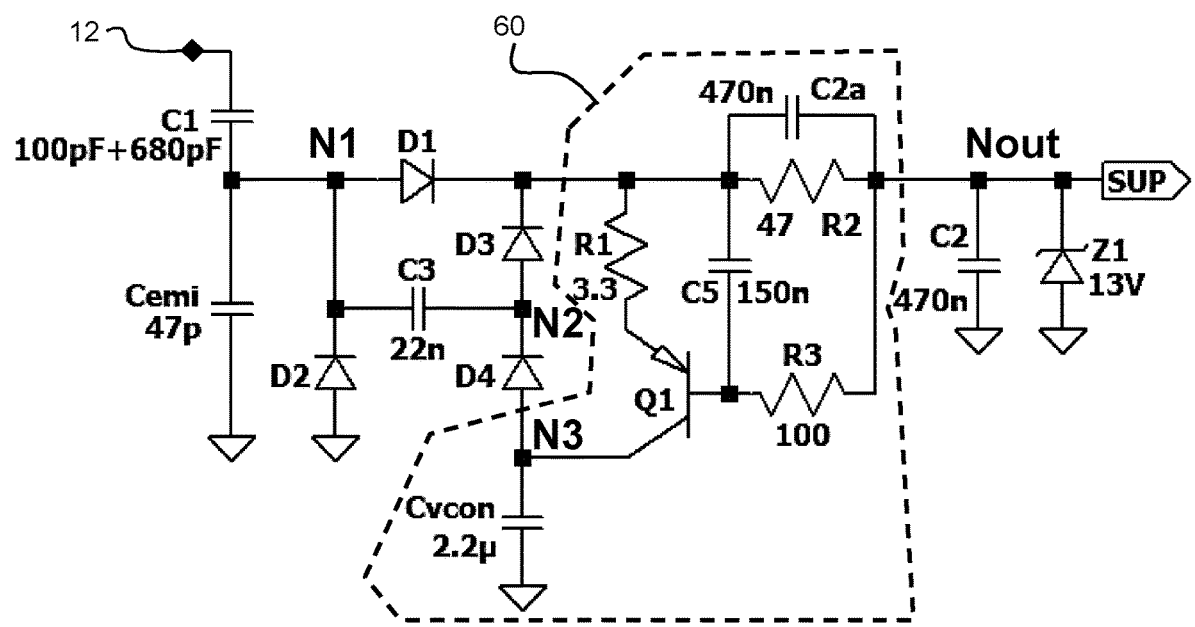
FIG. 11 shows one example of actual circuit implementation in more detail.

FIG. 11 shows one example of actual circuit implementation.

As mentioned above, the voltage Vcon may be adjusted either to make the output voltage Vsup approximate a desired value, or else to make the supply current being delivered to the load approximate a desired value. FIG. 11 shows an implementation with current feedback control.

Note that in this implementation, the current through clamping Zener diode Z1 is taken to be part of the delivered supply current.

As in the examples above, one node of the first capacitor C1 connects to the HV input 12, the other node of the first capacitor C1, at node N1, connects to D1, D2 and C3.

A small capacitor Cemi is added and functions in the same way as the known capacitor C3 of FIG. 5 connected to a fixed reference (ground).

This circuit implements the inverted polarity approach for Vcon of FIG. 9, but with Vcon and D3 referenced to Vsup instead of ground as in FIG. 10.

This shows that many different approaches for the reference levels are possible.

The controllable voltage supply 60 comprises a resistor R1 and a bipolar junction transistor Q1 in series, and in this example in parallel with the diode arrangement D3, D4. It has a current sense resistor R2 in series with the DC voltage supply node Nout.

The controllable voltage supply is connected between the cathode of the diode D1 and a third node N3.

This third node N3 connects to ground through a capacitor Cvcon rather than to Vsup as in FIG. 10. This gives improved startup behavior but is not fundamental. The capacitor Cvcon simply carries the inverted Vcon voltage plus a DC offset of +Vsup.

Whenever the voltage across Cvcon is zero, the voltage swing between D3 and D4 is equal to Vsup+2*$V_{be}$, and no (excess) charge is extracted from the node N1 via C3. Conversely, when the voltage across Cvcon is Vsup there will be only 2*$V_{be}$ voltage swing between D3 and D4, and the maximum amount of charge will be extracted via C3 from the first node N1.

The Cvcon capacitance is large, so the voltage across Cvcon will only change slowly, such that that voltage can be considered as constant during an HF cycle.

Charge is extracted from Cvcon via D4 and will be restored into Cvcon via the transistor Q1 of the controllable voltage supply.

Any imbalance between charge extraction and injection of Cvcon (averaged over an HF cycle) will result in an increase or decrease of the voltage across Cvcon. As such, Cvcon acts as the integration capacitor of the control loop adjusting the −Vcon voltage.

The charge flow through D1 flows into C2 via the resistor R2 and parallel capacitor C2a. The capacitor C2a acts as a direct HF path for the high-frequency components in the pulsed current through D1 and also averages the voltage drop across R2.

If the averaged voltage drop across R2 exceeds the base emitter voltage of the transistor Q1 (a PNP bipolar transistor), Q1 will become conductive and Cvcon will be charged via Q1. The base emitter voltage of Q1 therefore acts as the reference value for the average voltage across R2, which in turn is directly proportional (as a result of the resistor R2) with the supply current into the load and Z1 combined, which is the current being controlled.

The additional components R3, R1 and C5 provide a further averaging/filtering on how the voltage across R2 translates into current through Q1. R1 further serves to reduce the DC loop gain of the control loop, assuring stability of that loop. Note that the dissipation of the excess charge, as extracted via C3, effectively takes place in Q1 (and R1). The "saturation" discussed above for Vcon for example takes place at a voltage level depending on the drop across R1 and Q1.

The invention may be applied to all charge-pump type LV supplies, but is particularly attractive to be used in LCC-type resonant convertor stages, such as used in a LED drivers.

The invention enables such LV supplies to be able to deliver a wide dynamic range of supply current and/or simply higher supply currents. This is a trend as a result of putting more features and intelligence in drivers.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A circuit for generating a DC voltage supply from a higher voltage AC signal, comprising:
   an input for receiving the higher voltage AC signal;
   a first capacitor in series between the input and a first node;
   a first diode in forward direction between the first node and a DC voltage supply node;
   a second capacitor between the DC voltage supply node and a reference terminal;
   a third capacitor between the first node and a second node;
   a second diode in forward direction between the reference terminal and the first node;
   a controllable voltage supply arranged to provide a voltage to the third capacitor via a third diode; and
   a diode arrangement comprising the third diode and a fourth diode in series across the controllable voltage supply, with the junction between the third and fourth diodes defining the second node.

2. A circuit as claimed in claim 1, further comprising a voltage clamping device between one terminal of the first diode and the reference terminal, wherein the voltage clamping device for example is a Zener diode.

3. A circuit as claimed in claim 1, wherein the reference terminal is ground.

4. A circuit as claimed in claim 1, wherein the controllable voltage supply has a terminal connected to a DC node or a low frequency AC node, directly or via a capacitor.

5. A driver circuit comprising:
   a resonant switch mode power converter providing a first output for driving a load; and
   a DC voltage supply circuit as claimed in claim 1, wherein the high voltage AC signal is a second output from the resonant switch mode power converter.

6. A driver circuit as claimed in claim 5, wherein the resonant switch mode power converter comprises an LCC converter.

7. A lighting circuit comprising:
   a driver circuit as claimed in claim 5;
   a lighting load driven by the first output; and
   auxiliary circuitry driven by the second output.

* * * * *